US010896343B2

(12) United States Patent
Shibata et al.

(10) Patent No.: US 10,896,343 B2
(45) Date of Patent: Jan. 19, 2021

(54) INFORMATION PROCESSING APPARATUS AND INFORMATION PROCESSING METHOD

(71) Applicant: Kabushiki Kaisha Toshiba, Tokyo (JP)

(72) Inventors: Tomoyuki Shibata, Kanagawa (JP); Osamu Yamaguchi, Kanagawa (JP); Yuto Yamaji, Kanagawa (JP); Masayuki Maruyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/438,873

(22) Filed: Feb. 22, 2017

(65) Prior Publication Data

US 2018/0005069 A1 Jan. 4, 2018

(30) Foreign Application Priority Data

Jun. 29, 2016 (JP) ................................ 2016-128319

(51) Int. Cl.
*G06K 9/00* (2006.01)
*G06K 9/46* (2006.01)
*G06K 9/62* (2006.01)

(52) U.S. Cl.
CPC ....... *G06K 9/4604* (2013.01); *G06K 9/00228* (2013.01); *G06K 9/00362* (2013.01); *G06K 9/00771* (2013.01); *G06K 9/6212* (2013.01)

(58) Field of Classification Search
CPC ....... A61B 2034/2065; G06K 2209/21; G06K 9/00228; G06K 9/00362; G06K 9/00771;

(Continued)

(56) References Cited

U.S. PATENT DOCUMENTS 7,467,118 B2 * 12/2008 Lanckriet ............ G06K 9/6262
706/20
2007/0230792 A1 * 10/2007 Shashua ............... G06K 9/6292
382/190

(Continued)

FOREIGN PATENT DOCUMENTS

JP 2011-253528 A 12/2011
JP 2015-087973 5/2015

(Continued)

OTHER PUBLICATIONS

Tuia et al. ("A Survey of Active Learning Algorithms for Supervised Remote Sensing Image Classification", 2011).*

(Continued)

*Primary Examiner* — Avinash Yentrapati
(74) *Attorney, Agent, or Firm* — Finnegan, Henderson, Farabow, Garrett & Dunner, L.L.P.

(57) ABSTRACT

According to an embodiment, an information processing apparatus includes a memory and processing circuitry. The processing circuitry configured to acquire a plurality of input images captured at a specific place. The processing circuitry configured to adapt an estimation model used for detecting a target object included in images to the specific place based on the plurality of input images. The processing circuitry configured to output a result of determination of an adaptation state for the specific place in the estimation model.

15 Claims, 16 Drawing Sheets

(58) Field of Classification Search
CPC ...... G06K 9/4604; G06K 9/6212; G06T 7/20; G06T 7/251; G06T 7/246; G06T 7/277; G06T 7/269
See application file for complete search history.

(56) References Cited

U.S. PATENT DOCUMENTS

| | | | | |
|---|---|---|---|---|
| 2009/0287620 A1* | 11/2009 | Xu | ............ | G06N 20/00 706/12 |
| 2011/0293136 A1* | 12/2011 | Porikli | ............ | G06N 20/00 382/103 |
| 2012/0263376 A1* | 10/2012 | Wang | ............ | G06K 9/6256 382/160 |
| 2015/0242709 A1* | 8/2015 | Pham | ............ | G06K 9/6259 382/160 |
| 2016/0162800 A1* | 6/2016 | Qin | ............ | G06N 3/0454 706/12 |
| 2016/0174902 A1* | 6/2016 | Georgescu | ............ | G06T 7/0012 600/408 |
| 2016/0247045 A1* | 8/2016 | He | ............ | G06N 20/00 |
| 2016/0260014 A1* | 9/2016 | Hagawa | ............ | G06K 9/4628 |
| 2017/0364733 A1* | 12/2017 | Estrada | ............ | G06K 9/6262 |
| 2018/0005089 A1 | 1/2018 | Pham | | |
| 2018/0012107 A1* | 1/2018 | Xu | ............ | G06K 9/6267 |

FOREIGN PATENT DOCUMENTS

| | | |
|---|---|---|
| JP | 2016-158712 | 9/2015 |
| JP | 2018-5405 | 1/2018 |

OTHER PUBLICATIONS

Pan et al. ("A Survey on Transfer Learning" 2010).*
Xu, Jiaolong, et al. "Incremental Domain Adaptation of Deformable Part-based Models." BMVC. 2014. (Year: 2014).*
Shaoqing Ren et al., "Global Refinement of Random Forest", IEEE Conference on Computer Vision and Pattern Recognition (CVPR), pp. 723-730 (2015).

* cited by examiner

INFORMATION PROCESSING APPARATUS AND INFORMATION PROCESSING METHOD

CROSS-REFERENCE TO RELATED APPLICATIONS

This application is based upon and claims the benefit of priority from Japanese Patent Application No. 2016-128319, filed on Jun. 23, 2016; the entire contents of which are incorporated herein by reference.

FIELD

Embodiments described herein relate generally to an information processing apparatus and an information processing method.

BACKGROUND

Adaptation apparatuses sire known which adapt an estimation model that is a regression model acquired through machine learning using leaning data of a general environment to a specific environment.

For example, when a general estimation model estimating the number of persons included in an image is adapted to an estimation system estimating the number of passing persons from an image capturing a pathway of a station or the like, such an adaptation apparatus corrects the general estimation model by using an image captured by an imaging apparatus disposed in a pathway of a station or the like. Such an adaptation technology, for example, is called domain adaptation, transfer learning, knowledge transfer, or the like.

Meanwhile, in a conventional adaptation apparatus, when a general estimation model is adapted to a specific environment, an operation performed by a user (operator) having specific knowledge or the like is necessary. For example, in the conventional adaptation apparatus, an operator or the like should input correct answer information for each image captured under a specific environment. In addition, for example, in the conventional adaptation apparatus, an operator or the like needs to determine whether adaptation is successful or unsuccessful by referring to an adaptation state. For this reason, in the conventional adaptation apparatus; user's burden is large, and the cost is high.

DETAILED DESCRIPTION

According to an embodiment, an information processing apparatus includes a memory and processing circuitry. The processing circuitry configured to acquire a plurality of input images captured at a specific place. The processing circuitry configured to adapt an estimation model used for detecting a target object included in images to the specific place based on the plurality of input images. The processing circuitry configured to output a result of determination of an adaptation state for the specific place in the estimation model.

Hereinafter, an estimation system 10 according to this embodiment will be described with reference to the drawings. In embodiments described below, since parts to which the same reference sign is assigned have an approximately same configuration and perform an approximately same operation, duplicate description except different points will not be presented as is appropriate.

First Embodiment

Figure 1:
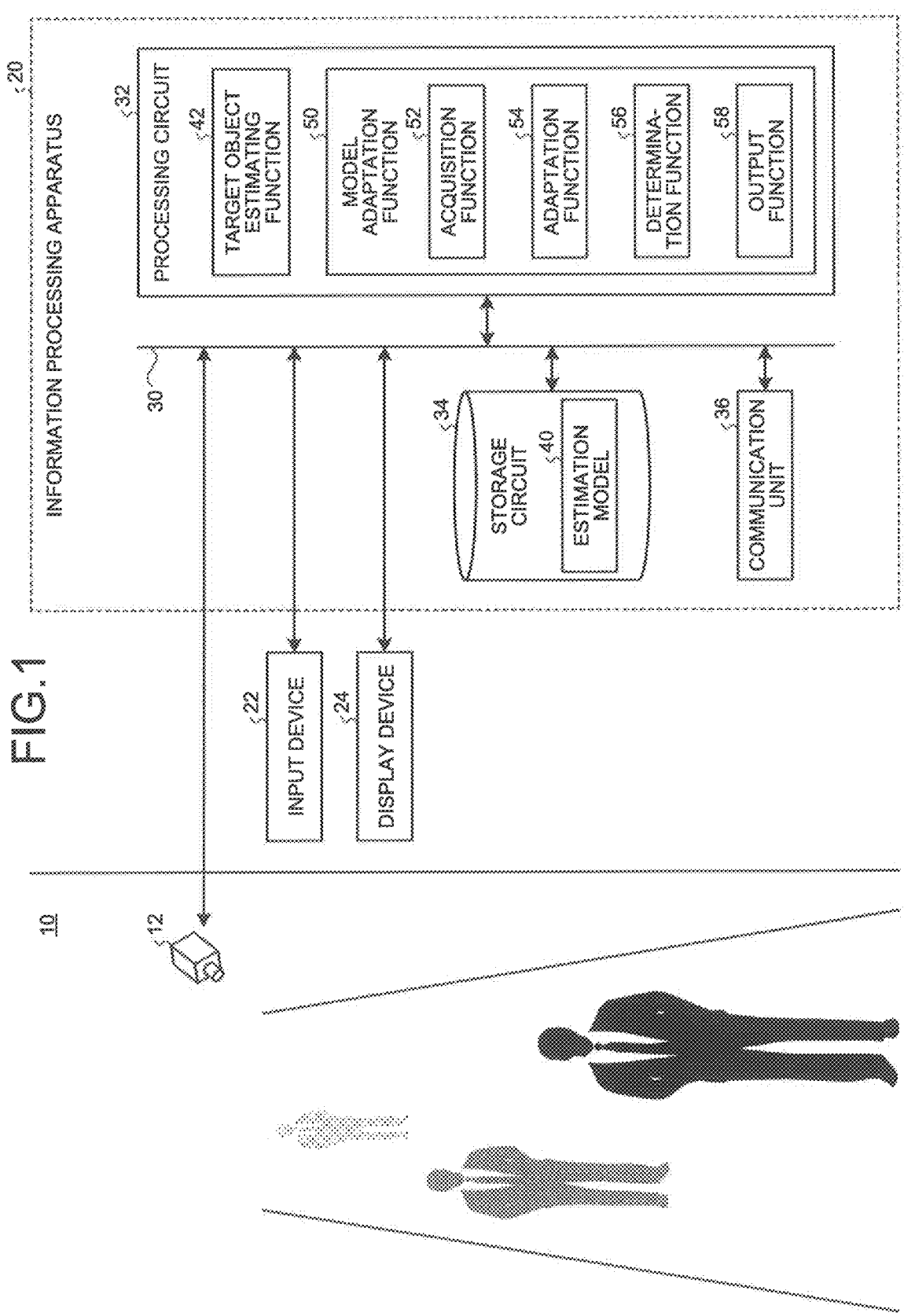
FIG. 1 is a diagram that illustrates an estimation system according to an embodiment.

FIG. 1 is a diagram that illustrates an estimation system 10 according to an embodiment.

The estimation system 10 estimates the positions or the number or target objects based on an image acquired by imaging target objects. In this embodiment, the target objects are persons. In this embodiment, the estimation system 10 estimates the positions or the number of persons included in an image that is imaged from a specific position in a station or the like. Here, the target objects are not limited to persons but, for example, may be vehicles, microorganisms, or the like.

The estimation system 10 includes: an imaging apparatus 12; an information, processing apparatus 20; an input device 22; and a display device 24.

The imaging apparatus 12 is disposed at a specific place at which a predetermined space which a target object passes through or stays at can be imaged. The imaging apparatus 12 images the predetermined space from the specific place. For example, when target objects are persons, the imaging apparatus 12 images a moving plane of a station or the like on which persons move at a predetermined angle from the above. The imaging apparatus 12 captures images at a predetermined frame rate and gives the images acquired to the information processing apparatus 20 as input images. The images captured by the imaging apparatus 12 may be various images such as visible-light images, infrared images, or distance images.

The information processing apparatus 20 performs various image processing using the input images captured by the imaging apparatus 12 and estimates the positions or number of target objects included in the input images. When the target objects are persons, the information processing apparatus 20 estimates the positions or number of persons included in the input images. The information processing apparatus 20, for example, is a dedicated or general-purpose computer. The information processing apparatus 20 may be a personal computer (PC) or a computer included in a server storing and managing images.

The information processing apparatus 20 includes: a processing circuit 32; a storage circuit 34; a communication unit 36; and a bus 30 connecting each unit. The information processing apparatus 20, for example, is connected to the imaging apparatus 12 through the bus 30.

The processing circuit 32 has a target object estimating function 42 and a model adaptation function 50. The model adaptation function 50 includes an acquisition function 52, an adaptation function 54, a determination function 56, and an output function 58. Such processing functions will be described later.

Each processing function performed by the information processing apparatus 20 is stored in the storage circuit 34 in the form of a program that is executable using a computer. The processing circuit 32 is a processor that realizes a function corresponding to each program by reading the program from the storage circuit 34 and executing the read program. The processing circuit 32 that is in a state in which each program is read has each function illustrated inside the processing circuit 32 illustrated in FIG. 1. In the case illustrated in FIG. 1, while the processing functions performed by the target object estimating function 42 and the model adaptation function 50 have been described to be realized in the single processing circuit 32, the functions may be realized by configuring the processing circuit 32 by combining a plurality of independent processors and executing programs using the processors. A case where each processing function is configured as a program, and one circuit executes each program may be employed, or a case where a specific function is implemented in a dedicated independent program execution circuit may be employed.

The target object estimating function 42 included in the processing circuit 32 is an example of an estimation device. In addition, the model adaptation function 50 included in the processing circuit 32 is an example of an adaptation device. The acquisition function 52, the adaptation function 54, the determination function 56, and the output function 58 may be referred to respectively as an respectively, an adaptation processor, a determiner, and an output unit.

The wording "processor" used in the description presented above, for example, represents a central processing unit (CPU), a graphical processing unit (GPU), an application specific integrated circuit (ASIC), or a circuit of a programmable logic device (for example, a simple programmable logic device (SPLD), a complex programmable logic device (CPLD), or a field programmable gate array (FPGA)). The processor realizes the function by reading a program stored in the storage circuit 34 and executing the read program. In addition, instead of storing a program in the storage circuit 34, the program may be configured to be directly built inside the circuit of the processor. In such a case, the processor realizes the function by reading the program built inside the circuit and executing the read program.

The storage circuit 34 stores data accompanying each processing function performed by the processing circuit 32 and the like as is necessary. In addition, the storage circuit 34 stores programs executed by the processing circuit 32.

Furthermore, the storage circuit 34 according to this embodiment stores an estimation model 40 that is a regression model used for the estimation of a target object. In addition, the storage circuit 34 according to this embodiment stores input images captured by the imaging apparatus 12. Furthermore, the storage circuit 34 according to this embodiment stores various set values used for the estimation process and the adaptation process of the estimation model 40, user interface images, and the like. The storage circuit 34 according to this embodiment stores various kinds of data generated, in stages of the estimation process and the adaptation process of the estimation model 10.

For example, the storage circuit 34 is a semiconductor device such as a random access memory (RAM) or a flash memory, a hard disk, an optical disk, or the like. The process performed by the storage circuit 34 may be substituted by an external storage device of the information processing apparatus 20. The storage circuit 34 may be a storage medium that downloads a program transmitted through a local area network (LAN), the Internet, or the like and stores or temporarily stores the downloaded program. Here, the number of storage media is not limited to one, but, when the process according to the embodiment described above is performed from a plurality of media, the media are included in the storage medium according to the embodiment, and any one of the configurations may be employed as the configuration of the medium.

The communication unit 36 is an interface that inputs/outputs information to/from an external device connected thereto in a wired or wireless manner. The communication unit 36 may perform communication with being connected to a network.

The input device 22 receives various instructions or information input from an operator. The input device 22, for example, is a pointing device such as a mouse or a track ball or an input device such as a keyboard.

The display device 24 displays various kinds of information such as image data. The display device 24, for example, is a display device such as a liquid crystal display.

The input device 22 and the display device 24 according to this embodiment are connected to the information processing apparatus 20 in a wired or wireless manner. The input device 22 and the display device 24 may be connected to the information processing apparatus 20 through a network.

Figure 2:
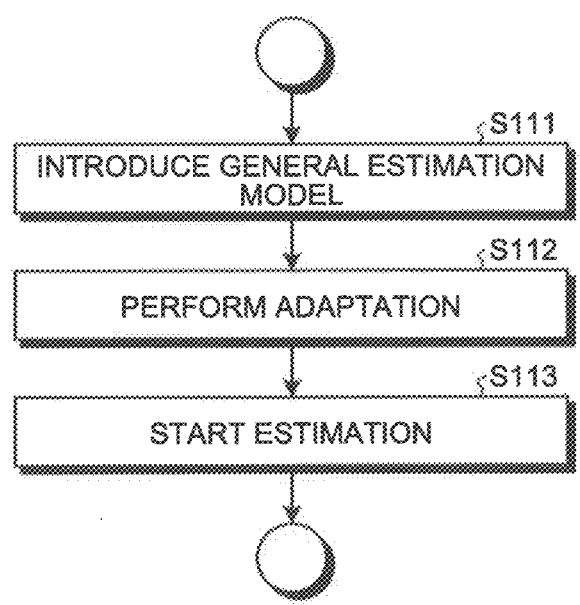
FIG. 2 is a flowchart that illustrates the processing sequence of an estimation system according to an embodiment.

FIG. 2 is a flowchart that illustrates the processing sequence of the estimation system 10 according to the embodiment.

First, in S111, the information processing apparatus 20 introduces a general estimation model 40. More specifically, the information processing apparatus 20 acquires a general estimation model 40 through a network, a medium, or the like and stores the acquired general estimation model 40 in the storage circuit 34 so as to be referred to by the processing circuit 32.

The general estimation model 40 is knowledge data acquired by machine learning using learning samples (images and correct answer information) imaged under a general environment. In other words, the general estimation model 40 is knowledge data acquired by machine learning from a large quantity of samples (images and correct answer information) covering a plurality of conditions.

Subsequently, in S112, the information processing apparatus 20 adapts the introduced general estimation model 40 to a specific place. For example, the information processing apparatus 20 starts an operation of the model adaptation function 50 included in the processing circuit 32 in accordance with a user's adaptation start instruction. The model adaptation function 50 corrects the estimation model 40 to adapt the estimation model 40 to a specific plaice based on a plurality of input images captured by the imaging apparatus 12. In other words, the information processing apparatus 20 adjusts the estimation model 40 to a specific place. Accordingly, when the positions or number of target objects is estimated by the estimation model 40 from images captured by the imaging apparatus 12 disposed in the specific place, the information processing apparatus 20 can decrease an estimation error.

When the adaptation of the estimation model 40 is successful, in S113, an estimation process using the estimation model 40 after the adaptation is started. For example, the information processing apparatus 20 starts the operation of the target object estimating function 42 included in the processing circuit 32 in accordance with a user's estimation start instruction. The target object estimating function 42 estimates the positions or number of target objects from input images captured by the imaging apparatus 12 by using the estimation model 40 after the adaptation.

Here, in this embodiment, the target object estimating function 42 estimates the number of target objects included in the input images by using a crowd analysis technology. More specifically, the process is performed as below. First, the target object estimating function 42 extracts a plurality of local images including parts in which a target object is present from input images. Subsequently, the target object estimating function 42, for each local image, acquires a vector representing the position of a target object in the local image by using the estimation model 40. Subsequently, the target object estimating function 42, for each local image, generates a density map that represents the presence of a person in the local image based on the acquired vector.

Subsequently, the target object estimating function 42 integrates the density maps by arranging the density maps at corresponding positions in the input images. Accordingly, the target object estimating function 42 can generate a density map of all the input images. Then, the target object estimating function 42 outputs an integrated value of the density map corresponding to all the input images as the number of persons included in the input images. Accordingly, the target object estimating function 42 can estimate the number of target objects included in the input images by using a crowd analysis technology.

In this embodiment, the target object estimating function 42, for example, may estimate the number of persons included, in the input images by using the estimation model 40 represented by a random forest illustrated in JP 2015-158712 A. In such a case, the target object estimating function 42 acquires a vector representing the position of a target object from various feature amounts of a local image by using the estimation model 40. Then, the target object estimating function 42 generates a density map corresponding to the local image based on the acquired vector.

In addition, when the estimation model 40 represented by such a random forest is used, the model adaptation function 50 may adapt the estimation model 40 to a specific place by using a transfer learning technology described in Shaoqing Ren, Xudong Cao, Yichen Wei, Jian Sun, "Global Refinement of Random Forest", IEEE Conference on Computer Vision and Pattern Recognition (CVPR), 2015, pp 723-730. In addition, the estimation model 40 is not limited to the random forest but may be any model, as long as the model is a model used for detecting a target object from an image.

By performing the process in the sequence described above, the estimation system 10 can estimate a target object from input images captured by the imaging apparatus 12.

Figure 3:
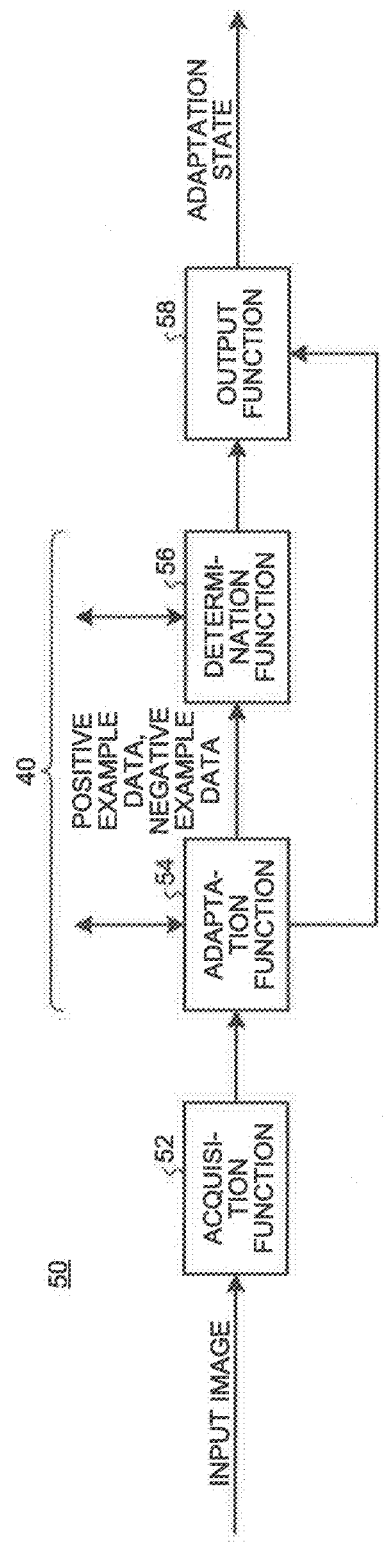
FIG. 3 is a diagram that illustrates the configuration of a model adaptation function.

FIG. 3 is a diagram that illustrates an example of the configuration of the model adaptation function 50. The model adaptation function 50 has: an acquisition function 52; an adaptation function 54; a determination function 55; and an output function 58.

The acquisition function 52 acquires a plurality of input images captured by the imaging apparatus 12 disposed at a specific place. The acquisition function 52 may acquire input images that are stored in advance from the storage circuit 34 or may sequentially acquire input images from the imaging apparatus 12 that is in the middle of an imaging process.

The adaptation function 54 adapts the estimation model 40 to a specific place based on the plurality of input images acquired by the acquisition function 52. In other words, the information processing apparatus 20 adjusts the estimation model 40 to a specific place based on the plurality of input images. Accordingly, when the positions or number of target objects is estimated from images captured by the imaging apparatus 12 disposed at the specific place by using the estimation model 40, the information processing apparatus 20 can decrease an estimation error. When the adaptation process is started, the adaptation function 54 gives information representing the start to the output function 58.

In addition, when the adaptation process of the estimation model 40 is performed, the adaptation function 54 generates a plurality of positive example data and a plurality of negative example data from a plurality of input images. The adaptation function 54 performs the adaptation process by using a part of the plurality of positive example data and the plurality of negative example data that are generated. In addition, the adaptation function 54 may perform adaptation by using only a plurality of positive example data or perform adaptation by using only a plurality of negative example data. Furthermore, the adaptation function 54 gives parts of the plurality of positive example data and the plurality of negative example data that are generated, which are not used for the adaptation process, to the determination function 56. In addition, the adaptation function 54 may give only the plurality of generated positive example data to the determination function 56. The adaptation function 54 will be further described with reference to FIG. 4.

After the adaptation process performed by the adaptation function 54 is completed, the determination function 56 determines an adaptation state for a specific place in the estimation model 40. In other words, the determination function 56 determines a degree of adaptation (a degree of adjustment), which is performed by the adaptation function 54, for a specific place in the estimation model 40. For example, the determination function 56 may determine whether the adaptation is successful or unsuccessful by verifying the estimation model 40 after the execution of the adaptation process.

More specifically, the determination function 56 calculates the estimation accuracy in the estimation model 40 after the execution of the adaptation process is performed by using the plurality of positive example data and the plurality of negative example data received from the adaptation function 54. In addition, the determination function 56 may calculate the estimation accuracy by using only a plurality of positive example data or calculate the estimation accuracy by using only a plurality of negative example data. The determination function 56 may determine a successful state of adaptation when the calculated estimation accuracy is predetermined accuracy or more and determine an unsuccessful state of adaptation when the estimation accuracy is less than the predetermined accuracy.

The determination function 56 gives a result of the determination of the adaptation state in the estimation model 40 to the output function 58. The determination function 56 will be further described with reference to FIG. 5.

The output function 58 outputs the result of the determination of the adaptation state received from the determination function 56. In other words, the output function 58 provides the adaptation state (the degree of adaptation for a specific place) received from the determination function 56 for a user. For example, the output function 58 causes the display device 24 to display the result of the determination of the adaptation state. For example, the output function 58 may output information representing that the adaptation is successful or information representing that the adaptation is unsuccessful as a result of the determination of the adaptation state. In this way, the output function 58 can notify whether the adaptation is successful or unsuccessful to a user.

In addition, the output function 58 may output information representing that the process is in the middle of adaptation when the adaptation process using the adaptation function 54 is started. In addition, the output function 58 may output information representing the completion of adaptation when the adaptation process using the adaptation function 54 ends or when a determination process using the determination function 56 ends.

Furthermore, when the stars of adaptation is notified, the output function 58 may calculate a time until the adaptation is completed. For example, the output function 58 calculates a time until adaptation is completed based on the number of a plurality of positive example data used by the adaptation function 54 for the adaptation. When an adaptation process is started, the output function 58 may output information representing a time until the adaptation is completed.

Figure 4:
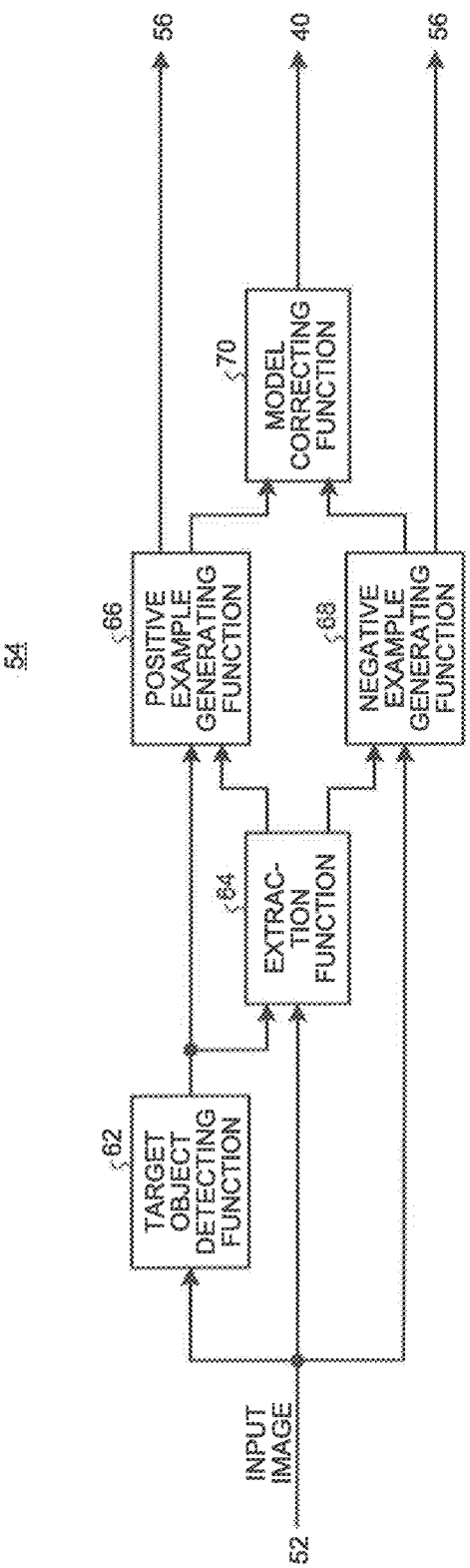
FIG. 4 is a diagram that illustrates the configuration of an adaptation function.

FIG. 4 is a diagram that illustrates the configuration of the adaptation function 54. The adaptation function 54 includes: a target object detecting function 62; an extraction function 64; a positive example generating function 66; a negative example generating function 68; and a model correcting function 70. The target, object detecting function 62, the extraction function 64, the positive example generating function 66, the negative example generating function 68, and the model correcting function 70 may be referred to respectively as a target object detector, an extractor, a positive example generator, a negative example generator, and a model corrector.

The target object detecting function 62 receives input images from the acquisition function 52. The target object detecting function 62 detects target objects included in each input image by performing a process different from a target object detecting process using the estimation model 40.

For example, the estimation model 40 is assumed to be a random forest used for estimating a label specifying a vector that represents a position of a target object from various feature amounts of a local image. In such a case, the target object detecting function 62 detects a target object by performing another process not using the random forest. When the target object is a person, for example, the target object detecting function 62 may detect a person by using a method for detecting a part or the whole of a human body from the inside of an image such as a face detecting process, a whole body detecting process, an upper-half body detecting process, a head part detecting process, or the like.

In addition, the target object detecting function 62 may improve the reliability of detection of a target object by performing a plurality of detection processes for one input image. For example, the target object detecting function 62 may perform a plurality of processes among a face detecting process, a whole-body detecting process, an upper-half body detecting process, and a head part detecting process. In addition, for example, the target object detecting function 62 may perform a plurality of face detecting processes using mutually-different algorithms. In such a case, the target object detecting function 62 may detect a portion detected as a target object by detection processes of a predetermined number or more as a target object and not detect a portion detected as a target object by detection processes of less than the predetermined number as a target object. In addition, the target object detecting function 62 may detect a target object included in each input image by predicting motions of the target object based on a plurality of input images aligned in a time series.

In addition, the target object detecting function 62 may determine a target object or not by using a threshold that is set such that an over-detection hardly occurs. In this way, the target object detecting function 62 can detect a portion having a very low possibility of erroneous detection as a target object, thereby improving the accuracy of the adaptation. Such a target object detecting function 62 can automatically detect a target object from an input image without receiving a user's input operation.

The extraction function 64 receives input images from the acquisition function 52. In addition, the extraction function 64 acquires a result of detection of a target object using the target object detecting function 62. Then, the extraction function 64 extracts local images including the target object from the input images. The local image is a pattern image given to the estimation model 40 when a target object is estimated using the estimation model 40.

The positive example generating function 66 acquires local images from the extraction function 64. In addition, the positive example generating function 66 acquires a result of detection of target objects using the target object detecting function 62. The positive example generating function 66 generates correct answer information that represents target objects included in a local image based on the acquired result of detection of target objects. The correct answer information, for example, may be the number of target objects, the positions of target objects, or a density map representing a density of target objects included in a local image. The positive example generating function 66 generates a plurality of positive example data that is a set of a local image and correct answer information representing target objects included in the local image. In this way, the positive example generating function 66 can generate positive example data without causing a user to input the correct answer information.

The positive example generating function 66 sets a part (for example, a half) of the plurality of generated positive example data for training and sets the other part (another half) thereof for verification. The positive example generating function 66 gives the plurality of positive example data for training to the model correcting function 70. In addition, the positive example generating function 66 gives the plurality of positive example data for verification to the determination function 56.

The negative example generating function 68 generates at least one piece of negative example data that is a set of a local image not including any target object and correct answer information representing no presence of a target object.

For example, when the imaging apparatus 12 is fixed, the negative example generating function 68 acquires a plurality of input images that are continuous in time. Then, the negative example generating function 68 generates a background image from the plurality of input images that are continuous in time by using a background automatic generating technology using the movement of target objects. Then, the negative example generating function 68 generates a local image not including any target object from the background image.

For example, when the imaging apparatus 12 is moved, the negative example generating function 68 may generate a local image not including any target object from an area that is not extracted as a local image including a target object. In addition, in a detection process performed by the target object detecting function 62, a local image not including any target object may be generated from an area determined not as a target object also by using a threshold that is set such that no detection hardly occurs. Such a negative example generating function 68 may generate a local image not including any target object from input images without receiving any user's input operation.

The number of pieces of the negative example data to be generated is smaller than that of the positive example data. Accordingly, the negative example generating function 68 may generate negative example data by receiving designation of an area in which any target object is not present from a user. In addition, the negative example generating function 68 may generate negative example data by receiving an input image captured in a situation in which any target object is not present in advance. The negative example generating function 68 gives at least one piece of the generated negative example data to the model correcting function 70.

The negative example generating function 68 sets a part (for example, a half) of the plurality of generated negative example data for training and sets the other part (another half) thereof for verification. The negative example generating function 68 gives the negative example data for training to the model correcting function 70. In addition, the negative example generating function 68 gives the negative example data for verification to the determination function 56. Here, the negative example generating function 68 may not generate negative example data for verification. In such a case, the negative example generating function 68 gives all the generated negative example data to the model correcting function 70.

The model correcting function 70 receives the plurality of positive example data from the positive example generating function 66. In addition, the model correcting function 70 receives at least one piece of negative example data from the negative example generating function 68. The model correcting function 70 adapts the estimation model 40 to a specific place by using the plurality of positive example data and the at least one piece of negative example data. For example, when the estimation model 40 is a random forest, the model correcting function 70 may adapt the estimation model 40 to a specific place by using the transfer learning technology described in Shaoqing Ren, Xudong Cao, Yichen Wei, Jian Sun, "Global Refinement of Random Forest", IEEE Conference on Computer Vision and Pattern Recognition (CVPR), 2015, pp 723-730.

Such an adaptation function 54 can perform the adaptation process for the estimation model 40 without receiving user's operation input. In this way, according to the adaptation function 54, art operation can be performed by a user having no specific knowledge.

Figure 5:
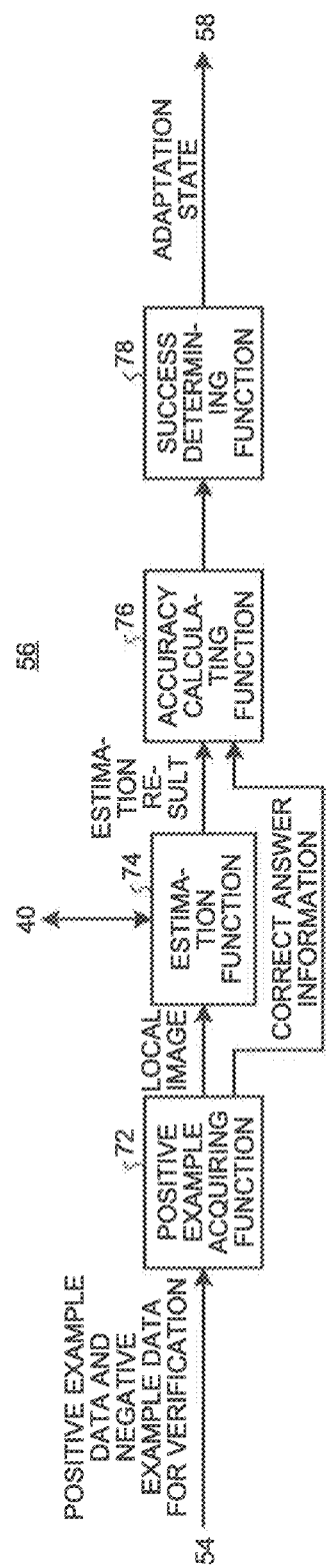
FIG. 5 is a diagram that illustrates the configuration of a determination function according to a first embodiment.

FIG. 5 is a diagram that illustrates an example of the configuration of the determination function 56 according to the first embodiment. The determination function 56 includes: a positive example acquiring function 72; an estimation function 74; an accuracy calculating function 76; and a success determining function 78. The positive example acquiring function 72, the estimation function 74, the accuracy calculating function 76, and the success determining function 78 are respectively examples of a positive example acquiring unit, an estimation unit, an accuracy calculating unit, and a success determining unit.

The positive example acquiring function 72 receives the plurality of positive example data for verification and at least one piece of negative example data from the adaptation function 54. In addition, the positive example acquiring function 72 may receive only positive example data for verification or only negative example data. The positive example acquiring function 72 gives a local image included in the positive example data and the negative example data to the estimation function 74 and gives the correct answer information included in the positive example data and the negative example data to the accuracy calculating function 76.

The estimation function 74 estimates a target object included in a local image from the local image by using the estimation model 40 after the execution of the adaptation process. For example, the estimation function 74 calculates a feature amount from the local image and outputs a result of the estimation of a target object included in the local image by using the estimation model 40 based on the calculated feature amount. The result of the estimation, for example, is the number or positions of target objects or a density map. The estimation function 74 gives the result of the estimation to the accuracy calculating function 76.

The accuracy calculating function 76 calculates the estimation accuracy based on the result of the estimation received from the estimation function 74 and the correct answer information received from the positive example acquiring function 72. For example, the accuracy calculating function 76 calculates a matching ratio of the result of the estimation to the correct answer information as the estimation accuracy. The accuracy calculating function 76 gives a result (for example, an average value of the estimation accuracies) of the synthesis of the estimation accuracies calculated for a plurality of positive example data to the success determining function 78.

The success determining function 78 compares the received estimation accuracy with a predetermined accuracy set in advance. When the estimation accuracy is the predetermined accuracy or more, the success determining function 78 determines a state in which adaptation is successful. On the other end, when the estimation accuracy is less than the predetermined accuracy, the success determining function 78 determines a state in which the adaptation is unsuccessful. Then, the success determining function 78 gives information representing whether the adaptation is successful or unsuccessful to the output function 58 as a result of the determination of the adaptation state in the estimation model 40.

Such a determination function 56 calculates the estimation accuracy by using the positive example data generated by the positive example generating function 66 and the negative example data, and accordingly, the operation can be performed by a user nor having specific knowledge. In addition, the determination function 56 can notify whether the adaptation is successful or unsuccessful to a user having no specific knowledge.

Figure 6:
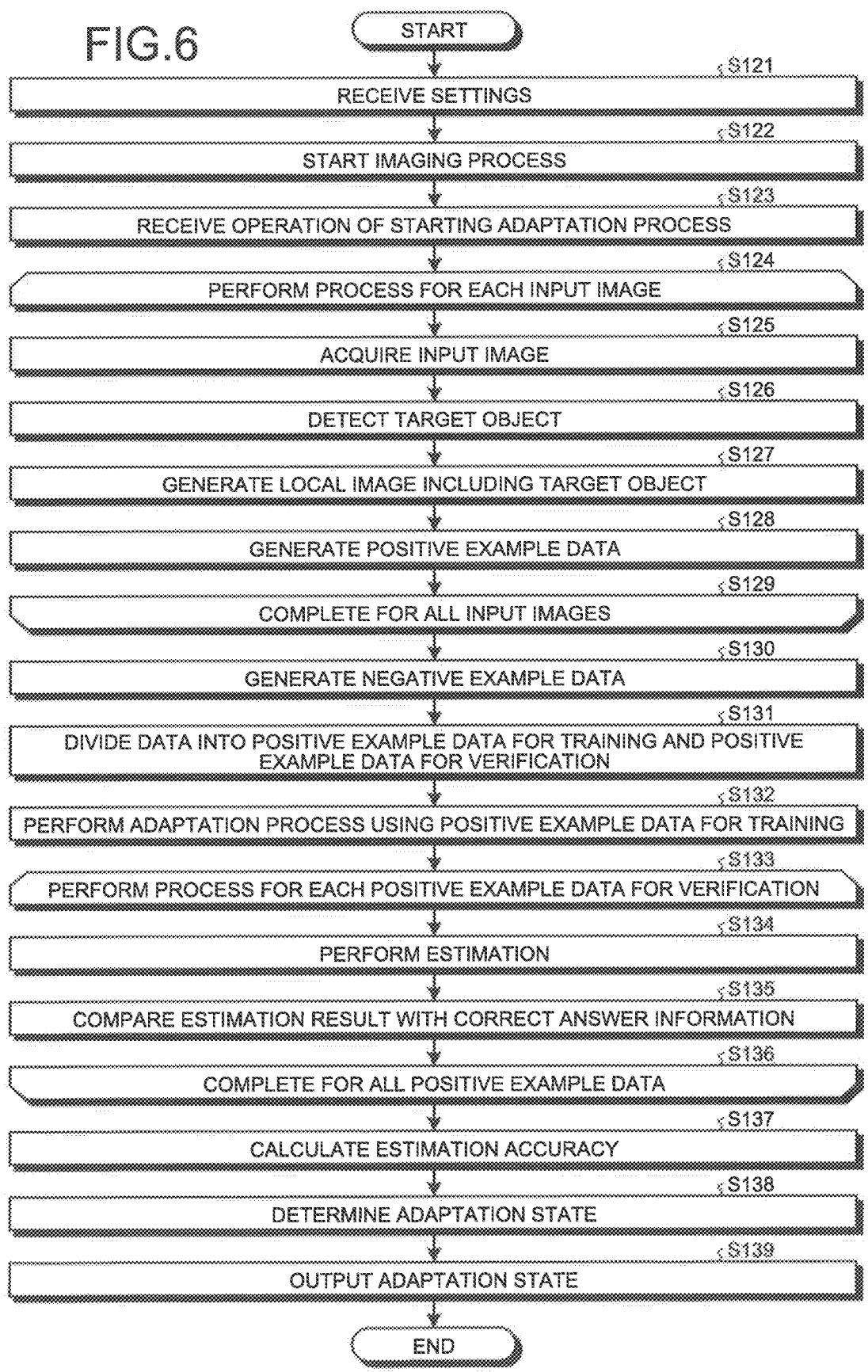
FIG. 6 is a flowchart that illustrates the processing sequence of an information processing apparatus.

FIG. 6 is a flowchart that illustrates the processing sequence of the information processing apparatus 20. When the general estimation model 40 is to be adapted to a specific place, the information processing apparatus 20 performs the process illustrated in FIG. 6.

First, in S121, the information processing apparatus 20 receives various settings. For example, the information processing apparatus 20 may receive a setting of the imaging direction (the position, the depression angle, and the like) of the imaging apparatus 12. In addition, the information processing apparatus 20 may receive settings of the focus, the gain, the brightness, the iris, the exposure time, and the like of the imaging apparatus 12.

Subsequently, in S122, the information processing apparatus 20 starts an imaging process. For example, the information processing apparatus 20 performs the imaging process at a predetermined frame rate for a period set in advance.

Subsequently, in S123, the information processing apparatus 20 receives an operation of starting an adaptation process. The information processing apparatus 20 may start an adaptation process after the completion of the imaging process of S122 or may start an adaptation process during the imaging process of S122.

Figure 7:
FIG. 7 is a diagram that illustrates an image displayed when adaptation is started.

The information processing apparatus 20, for example, may display a user interface image as illustrated in FIG. 7 and receive an instruction of starting an adaptation process from a user. When an instruction of starting the adaptation process is received from the user, the information processing apparatus 20 starts the adaptation process by calling the model adaptation function 50.

Figure 8:
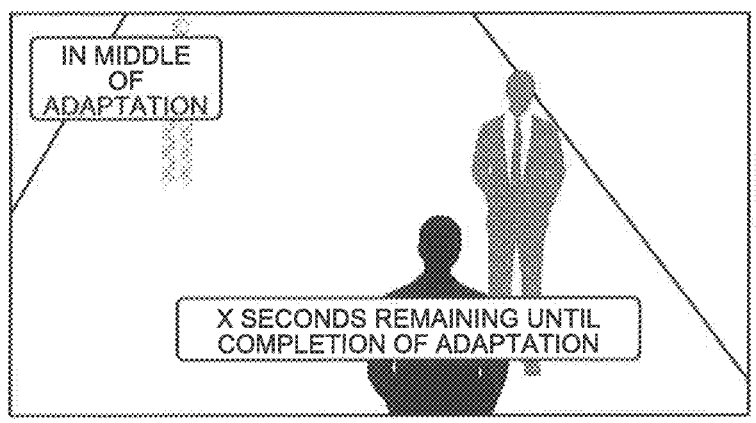
FIG. 8 is a diagram that illustrates an image displayed during adaptation.

In addition, when adaptation process is started, the information processing apparatus 20 may notify the middle of the process of the adaptation to the user by displaying a user interface image as illustrated in FIG. 8. In such a case, the information processing apparatus 20 may estimate a time that is necessary for the adaptation process based on the number of input images and the like and display a time until the completion of the adaptation process.

Subsequently, the model adaptation function 50 performs the process of S125 to S128 for each input image (a loop between S124 and S129). Within the loop, first, in S125, the acquisition function 52 acquires an input image. Subsequently, in S126, the adaptation function 54 detects a target object from the input image by performing a process different from the target object detecting process using the estimation model 40.

Subsequently, in S127, the adaptation function 54 extracts a local image including a target object from the input image. Subsequently, in S128, the adaptation function 54 generates correct answer information for the extracted local image and generates positive example data that is a set of the local image and the correct answer information. In addition, the adaptation function 54 may generate a plurality of positive example data for one input image.

When the process is completed for all the input images (the loop between S124 and S129 ends), the adaptation function 54 causes the process to proceed to S130. In S130, the adaptation function 54 generates negative example data. In addition, the adaptation function 54 may generate negative example data within the loop between S124 and S129.

Subsequently, in S131, the adaptation function 54 divides the plurality of positive example data into positive example data for training and positive example data for verification. Subsequently, in S132, the adaptation function 54 performs the adaptation process for the estimation model 40 by using a plurality of the positive example data and the negative example data for training.

Subsequently, the determination function 56 performs the process of S134 to S135 for each positive example data for verification (a loop between S133 and S136). Within the loop, first, in S134, the determination function 56 estimates a target object from a local image included in the positive example data for verification. Subsequently, in S135, the determination function 56 compares a result of the estimation with the correct answer information included in the positive example data for verification.

When the process is completed for all the positive example data for verification (the loop between S133 and S136 ends), the determination function 56 causes the process to proceed to S137. In S137, the determination function 56 calculates an estimation accuracy based on a result of the comparison between the result of the estimation and the correct answer information for all the positive example data for verification.

Subsequently, in S138, the determination function 56 determines an adaptation state based on the estimation accuracy. More specifically, the determination function 56 determines a successful state of the adaptation when the estimation accuracy is a predetermined accuracy or more and determines an unsuccessful state of the adaptation when the estimation accuracy is less than the predetermined accuracy.

Figure 9:
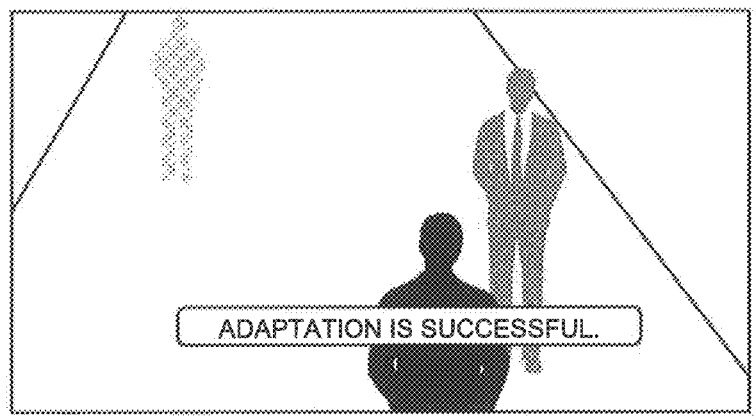
FIG. 9 is a diagram that illustrates an image displayed when adaptation is successful.

Subsequently, in S139, the output function 58 outputs the adaptation state. More specifically, the output function 58 outputs information representing successful adaptation when a state in which the adaptation is successful is determined. For example, the output function 58 displays information representing successful adaptation by using a user interface image as illustrated in FIG. 9.

Figure 10:
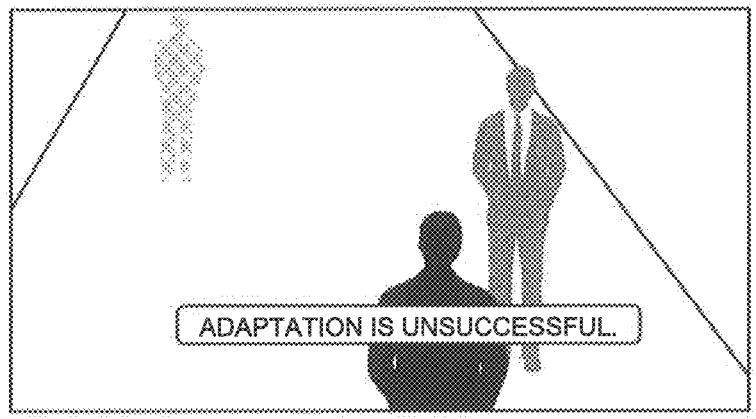
FIG. 10 is a diagram that illustrates an image displayed when adaptation is unsuccessful.

On the other hand, when a state in which the adaptation is unsuccessful is determined, the output function 58 outputs information representing unsuccessful adaptation. For example, the output function 58 displays information representing unsuccessful adaptation by using a user interface image as illustrated in FIG. 10.

As above, when the estimation model 40 is to be adapted to a specific place, the information processing apparatus 20 according to this embodiment determines and outputs the adaptation state of the estimation model 40. In this way, according to the information processing apparatus 20, also a user having no specific knowledge can recognize a result of the determination of the adaptation state, whereby the user's load can be alleviated.

Second Embodiment

Figure 11:
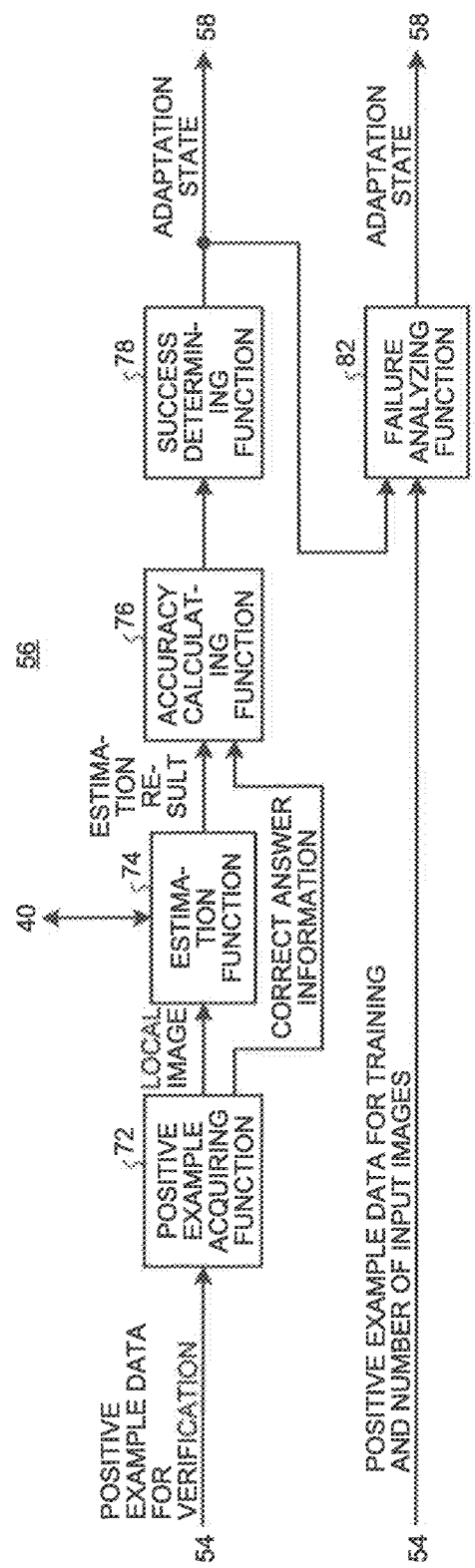
FIG. 11 is a diagram that illustrates the configuration of a determination function according to a second embodiment.

FIG. 11 is a diagram that illustrates the configuration of a determination function 56 according to a second embodiment.

The determination function 56 according to the second embodiment further includes a failure analyzing function 82. The failure analyzing function 82 corresponds to a failure analyzing unit.

When the success determining function 78 determines an unsuccessful state of the adaptation, the failure analyzing function 82 analyzes a failure factor. The failure analyzing function 82 acquires a plurality of positive example data for training and the number of input images from the adaptation function 54.

The failure analyzing function 82 determines whether or not the number of pieces of the positive example data is a first threshold set in advance or less and a second threshold or more. Here, the second threshold has a value smaller than the first threshold.

The first threshold is the number of pieces of positive example data having high quality that is required for a success of the adaptation process of the estimation model 40 with a very high probability. Accordingly, when the adaptation of the estimation model 40 is unsuccessful although the number of pieces of the positive example data is more than the first threshold, the failure analyzing function 82 can determine that the quality of the positive example data is low.

The second threshold is a value for which, when only positive example data of less than the second threshold can be generated although input images of a sufficient number are present, the quality of input images can be determined to be low, for example, a method of setting the imaging apparatus 12 capturing the input images or the contents of the input images can be determined to be bad.

When the adaptation is unsuccessful and when the number of pieces of positive example data is the first threshold, which is set in advance, or less and the second threshold, which is less than the first threshold, or more, the failure analyzing function 82 determines a state in which the number of images used for the adaptation is small. In other words, the failure analyzing function 82 determines that the adaptation is unsuccessful since the number of images used for the adaptation is small while there is no problem, in the quality of the positive example data or the quality of the input images.

In addition, when the adaptation is unsuccessful and when the number of pieces of positive example data is more than the first threshold, which is set in advance, or less than the second threshold that is less than the first threshold, the failure analyzing function 82 determines a state in which the quality of images used for the adaptation is low. In other words, the failure analyzing function 82 determines that the adaptation is unsuccessful since the quality of the positive example data or the quality of the input images is low while there is no problem in the number of images used for the adaptation.

When the adaptation is unsuccessful, the failure analyzing function 82 gives such a result of the determination to the output function 58 as the result of the determination of the adaptation state of the estimation model 40.

Figure 12:
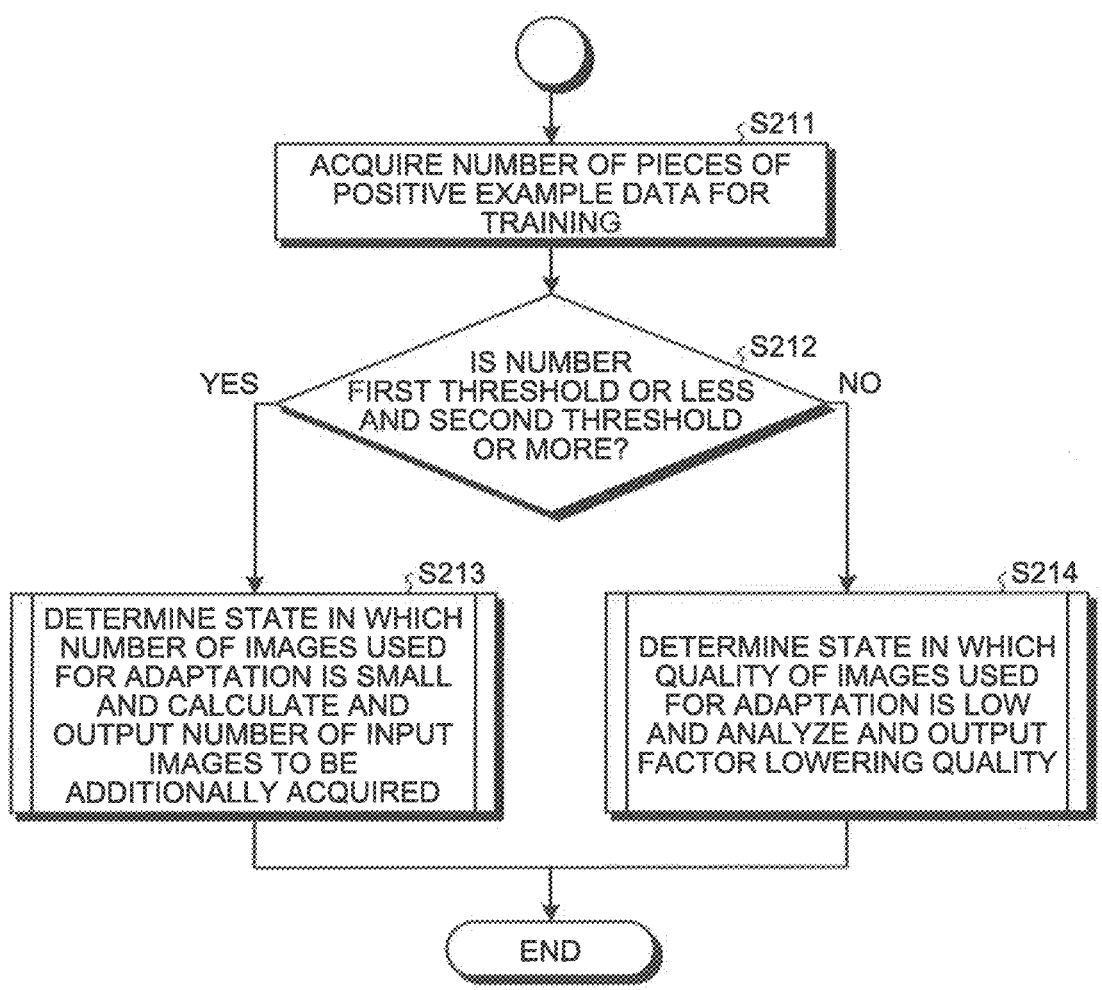
FIG. 12 is a flowchart that illustrates the processing sequence of a determination function according to the second embodiment.

FIG. 12 is a flowchart that illustrates the processing sequence of the determination function 56 according to the second embodiment. When the adaptation of the estimation model 40 is determined to be unsuccessful, the determination function 56 performs the process illustrated in FIG. 12.

First, in S211, the determination function 56 acquires the number of pieces of the positive example data for training used in the adaptation process. Subsequently, in S212, the determination function 56 determines whether or not the number of the positive example data for training is the first threshold or less and the second threshold or more.

When the number of pieces of the positive example data for training is the first threshold or less and the second threshold or more (S212: Yes), in S213, the determination function 56 determines a state in which the number of images used for the adaptation is small. Then, for example, in S213, the determination function 56 calculates the number of input images (or an imaging time) to be additionally acquired. In addition, the determination function 56 outputs being unsuccessful of the adaptation and the calculated number of input images (or an imaging time) to be additionally acquired to the user.

In this way, the determination function 56 can notify the user that the factor of the failure of the adaptation is a small number of images used for the adaptation and allow the user to perform an appropriate response. Then, when the process of S213 ends, the determination function 56 ends the process of this flow. A more detailed process of S213 will be further described with reference to FIG. 13.

On the other hand, when the number of pieces of the positive example data for training is larger than the first threshold or less than the second threshold (S212: No), in S214, the determination function 56 determines a state in which the quality of images used for adaptation is low. Then, for example, in S214, the determination function 56 analyzes the factor lowering the quality. In addition, the determination function 56 outputs information representing unsuccessful adaptation and a factor lowering the quality to the user.

In this way, the determination function 56 can notify the user that the factor of the failure of the adaptation is low quality of the images used for the adaptation and allow the user to perform an appropriate response. Then, when the process of S214 ends, the determination function 56 ends the process of this flow. A more detailed process of S214 will be further described with reference to FIG. 15.

Figure 13:
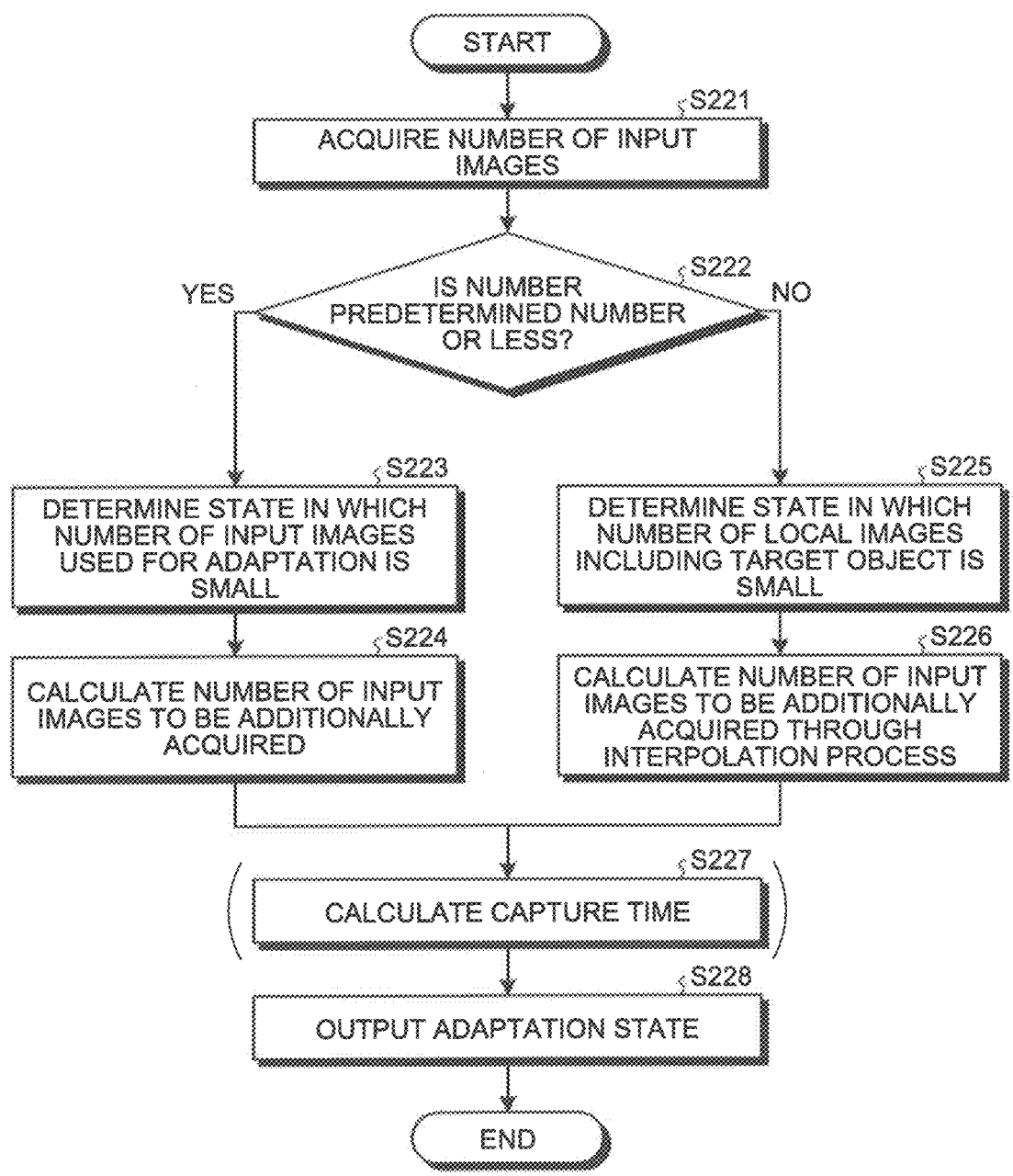
FIG. 13 is a flowchart that illustrates the processing sequence in S213.

FIG. 13 is a flowchart that illustrates the processing sequence in S213 illustrated in FIG. 12. The determination function 56, in S213 illustrated in FIG. 12, performs the process illustrated in FIG. 13.

First, in S221, the determination function 56 acquires the number of input images used for the adaptation process. Subsequently, in S222, the determination function 56 determines whether or not the number of the input images is a predetermined number or less. When the number of the input images is the predetermined number or less (S222: Yes), the determination function 56 causes the process to proceed to S223. When the number of the input images is the predetermined number or more (S222: No), the determination function 56 causes the process to proceed to S225.

In S223, the determination function 56 determines a state in which the number of the input images used for the adaptation is small. In this way, the determination function 56 can notify the user that the factor of the failure of the adaptation is a small number of the input images (the number of captured images).

Subsequently, in S224, the determination function 56 calculates the number of Input images to be additionally acquired. For example, the determination function 56 calculates the number of input images to be additionally acquired by subtracting the number of the input images used for the adaptation from the number of required input images set in advance. In this way, the determination function 56 can calculate the number of input images required for successful adaptation. When the process of S224 ends, the determination function 56 causes the process to proceed to S227.

Meanwhile, in S225, the determination function 56 determines a state in which the number of local images, which have a target object included therein, used for the adaptation is small. In this way, the determination function 56 can notify the user that the factor of the unsuccessful adaptation is a small number of local images used for the adaptation.

Subsequently, in S226, the determination function 56 calculates the number of input images to be additionally captured through an interpolation process. For example, the determination function 56 calculates the number of input images to be additionally acquired, which are required for extracting local images of a number set in advance, based on a ratio between the number of acquired input images and the number of local images used for the adaptation. In this way, the determination function 56 can calculate the number of input images required for successful adaptation. When the process of S226 ends, the determination function 56 causes the process to proceed to S227.

In S227, the determination function 56 calculates a capture time of a case where input images to be additionally acquired are acquired through a capturing process from the number of input images to be additionally acquired. More specifically, the determination function 56 calculates a capture time based on the number of input images to be additionally acquired and the frame rate. In this way, the determination function 56 can calculate a capture time that is required for successful adaptation. In addition, the determination function 56, in the next S228, when a capture time is not output, may not perform the process of S227.

Subsequently, in S228, the determination function 56 outputs a result of the determination of the adaptation state. More specifically, the determination function 56 outputs information representing unsuccessful adaptation and unsuccessful adaptation due to an insufficient number of input images. In such a case, the determination function 56 may additionally output at least one of the number of input images to be additionally acquired and the capture time.

Figure 14:
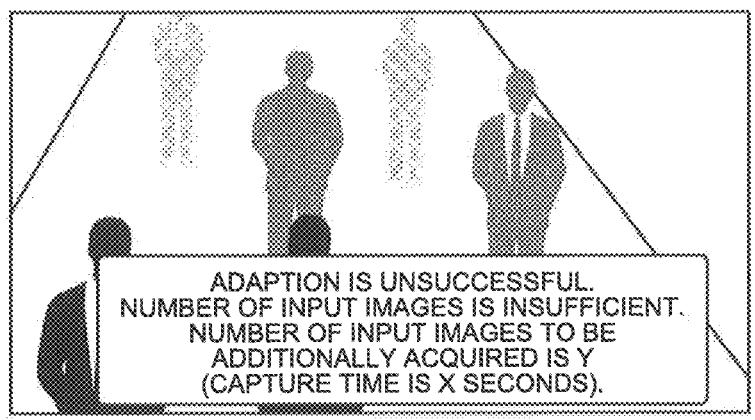
FIG. 14 is a diagram that illustrates an image displayed when an input image is insufficient.

For example, the determination function 56 displays a user interface image as illustrated in FIG. 14 and notifies the user that the adaptation is unsuccessful, and the number of input images is insufficient, and the number of input images to be additionally acquired (or the capture time).

In addition, when the number of input images is determined to be a predetermined number or less in S222 (S222: Yes), the determination function 56 may notify the user that the adaptation is unsuccessful due to a small number of captured input image. On the other hand, when the number of input images is determined to be more than the predetermined number in S222 (S222: No), the determination function 56 may notify the user that adaptation is unsuccessful due to a small number of local images having target objects included therein although the number of captured input images is sufficient. In addition, when the process of S227 ends, the determination function 56 ends the process of this flow.

As above, when the adaptation is unsuccessful and when the number of pieces of positive example data is the first threshold, which is set in advance, or less and the second threshold, which is less than the first threshold, or more, the determination function 56 can notify & state in which the number of images used for the adaptation is small to the user. In this way, according to the determination function 56, also a user having no specific knowledge can appropriately respond, and the adaptation can be successful.

In addition, the determination function 56 can output the number of input images or a capture time to be additionally acquired for successful adaptation to the user. In this way, the determination function 56 can notify a cost (the number of images or a time) required for successful adaptation to the user.

Figure 15:
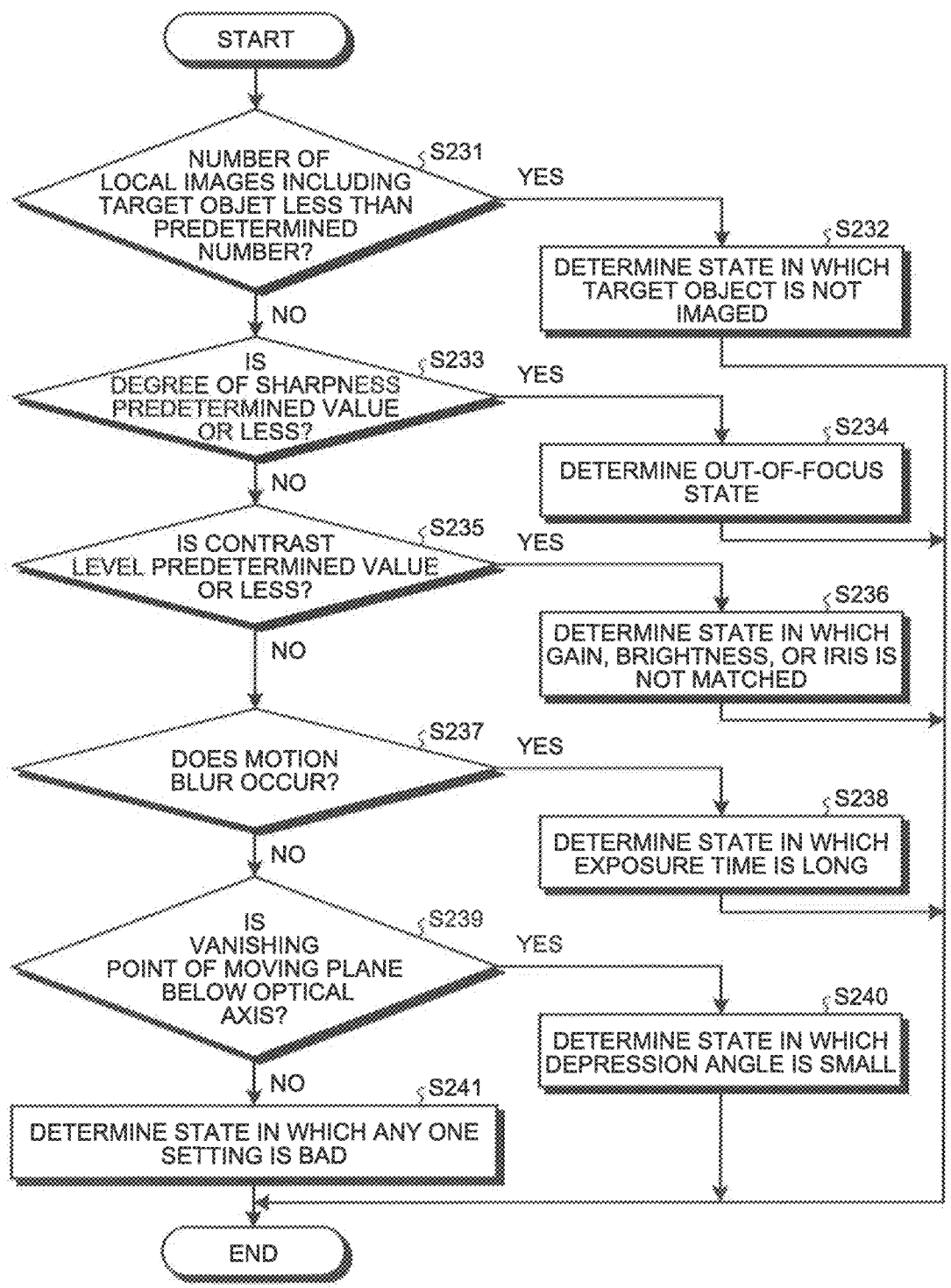
FIG. 15 is a flowchart that illustrates the processing sequence in S214.

FIG. 15 is a flowchart that illustrates the processing sequence in S214 illustrated in FIG. 12. The determination function 56 performs the process illustrated in FIG. 15 in S214 illustrated in FIG. 12.

First, in S231, the determination function 56 determines whether or not the number of local images having target objects included therein is less than a predetermined number. The predetermined number, for example, may be a number less than the second threshold. In addition, the predetermined number may be a value acquired by multiplying the number of input images by a value set in advance. When the number of local images having target objects included therein is less than the predetermined number (S231: Yes), the determination function 56 causes the process to proceed to S232. On the other hand, when the number of local images having target objects included therein is the predetermined number or more (S231: No), the determination function 56 causes the process to proceed to S233.

In S232, the determination function 56 determines a state in which a target object is not imaged. In this way, the determination function 56 can notify the user that the factor of the unsuccessful adaptation is no imaging of a target object.

Then, the output function 58 outputs information representing a state in which the target object is not imaged as a result of the determination of the adaptation state. More specifically, the output function 58 outputs information representing unsuccessful adaptation and the unsuccessful adaptation due to no imaging of the target object.

Figure 16:
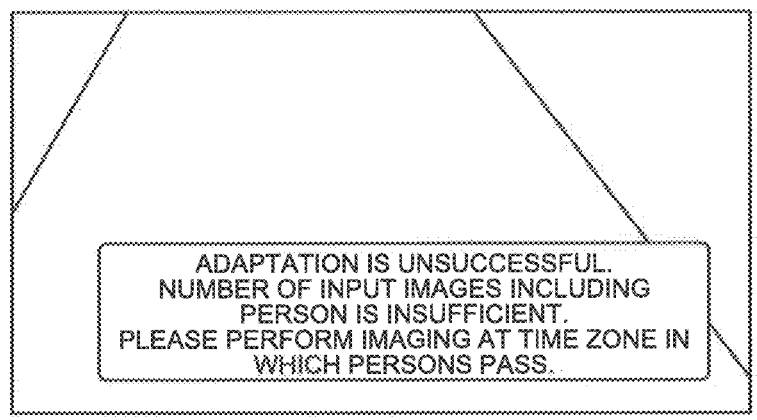
FIG. 16 is a diagram that illustrates an image displayed when an input image including a target object is insufficient.

For example, the output function 58 notifies the user that the adaptation is unsuccessful, and the target object is not imaged by displaying a user interface image as illustrated in FIG. 16. In addition, in such a case, the output function 58 may notify an advice of a process to be performed for successful adaptation to the user. For example, the output function 58 may notify performing of imaging at a time zone in which persons that are target objects pass to the user. When the process of S232 ends, the determination function 56 ends the process of this flow.

In S233, the determination function 56 acquires at least one from among the input images and calculates a degree of sharpness. The determination function 56 may average the degrees of sharpness of a plurality of input images. Then, the determination function 56 determines whether or not the degree of sharpness is a predetermined value or less. When the degree of sharpness is the predetermined value or less (S233: Yes), the determination function 56 causes the process to proceed to S234. On the other hand, when the degree of sharpness is more than the predetermined value (S233: No), the determination function 56 causes the process to proceed to S235.

In S234, the determination function 56 determines an out-of-focus state of the imaging apparatus 12. In this way, the determination function 56 can notify the user that the factor of the unsuccessful adaptation is out-of-focus.

Then, the output function 58 outputs information representing the out-of-focus state of the imaging apparatus 12 as a result of the determination of the adaptation state. More specifically, the output function 58 outputs information representing unsuccessful adaptation and the unsuccessful adaptation due to out-out-focus of the imaging apparatus 12.

Figure 17:
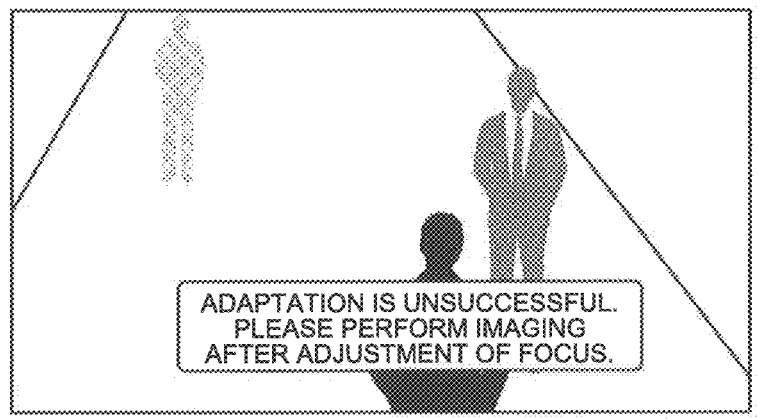
FIG. 17 is a diagram that illustrates an image displayed in the case of out-of-focus.

For example, the output function 58 notifies the user that the adaptation is unsuccessful, and of out-of-focus of the imaging apparatus 12 by displaying a user interface image as illustrated in FIG. 17. In addition, in such a case, the output function 58 may notify an advice of a process to be performed for successful adaptation to the user. For example, the output function 58 may notify adjustment of the focus to the user. When the process of S234 ends, the output function 58 ends the process of this flow.

In S235, the determination function 56 acquires at least one from among the input images and calculates a contrast level. The determination function 56 may average the contrast levels of a plurality of input images. Then, the determination function 56 determines whether or not the contrast level is a predetermined value or less. When the contrast level is the predetermined value or less (S235: Yes), the determination function 56 causes the process to proceed to S236. On the other hand, when the contrast level is more than the predetermined value (S235: No), the determination function 56 causes the process to proceed to S237.

In S236, the determination function 56 determines a state in which the gain, the brightness, or the iris of the imaging apparatus 12 is not matched. In this way, the determination function 56 can notify the user that the factor of the unsuccessful adaptation is no match of the gain, the brightness, or the iris.

Then, the output function 58 outputs information representing the state of no match of the gain, the brightness, or the iris of the imaging apparatus 12 as a result of determination of the adaptation state. More specifically, the output function 58 outputs information representing unsuccessful adaptation and the unsuccessful adaptation due to no match of the gain, the brightness, or the iris of the imaging apparatus 12.

Figure 18:
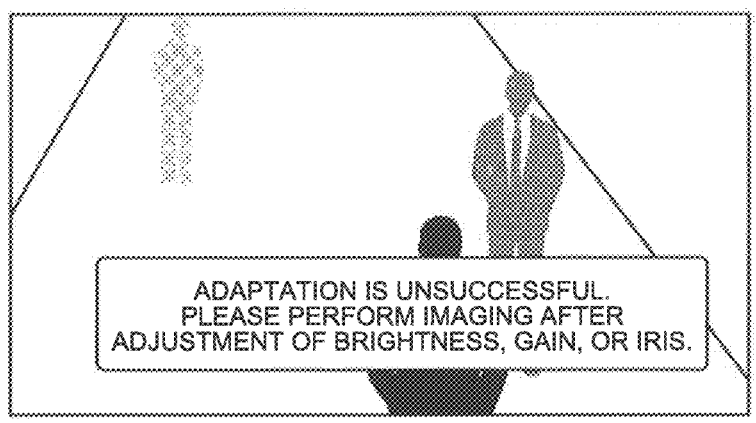
FIG. 18 is a diagram chat illustrates an image displayed when a contrast level is not matched.

For example, the output function 58 notifies unsuccessful adaptation and no match of the gain, the brightness, or the iris of the imaging apparatus 12 to the user by displaying a user interface image as illustrated in FIG. 18. In addition, in such a case, the output function 58 may notify an advice of a process to be performed for successful adaptation to the user. For example, the output function 58 may notify adjustment of the gain, the brightness, or the iris to the user. When the process of S236 ends, the output function 58 ends the process of this flow.

In S237, the determination function 56 acquires a plurality of input images that are continuous and detects whether or not a motion blur occurs. Then, the determination function 56 determines whether or not a motion blur occurs. When a motion blur occurs (S237: Yes), the determination function 56 causes the process to proceed to S238. On the other hand, when no motion blur occurs (S237: No), the determination function 56 causes the process to proceed to S239.

In S238, the determination function 56 determines a state in which the exposure time of the imaging apparatus 12 is long. In this way, the determination function 56 can notify the user that the factor of the unsuccessful adaptation is a long exposure time.

Then, the output function 58 outputs information representing the state in which the exposure time of the imaging apparatus 12 is long as a result of the determination of the adaptation state. More specifically, the output function 58 outputs information representing unsuccessful adaptation and the unsuccessful adaptation due to a long exposure time of the imaging apparatus 12.

Figure 19:
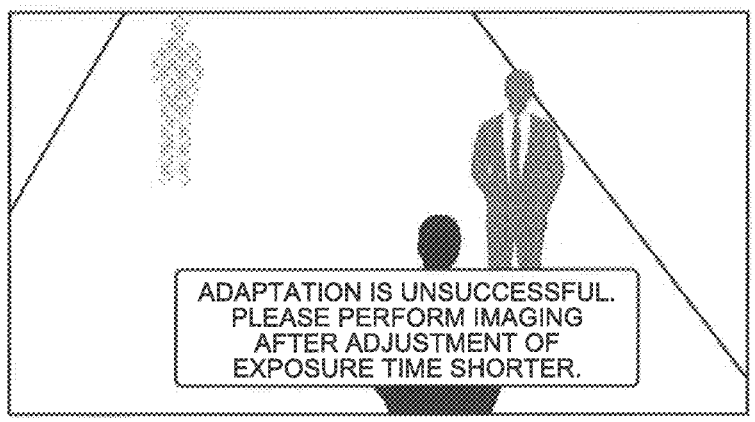
FIG. 19 is a diagram that illustrates an image displayed when a motion blur occurs.

For example, the output function 58 notifies unsuccessful adaptation and a long exposure time of the imaging apparatus 12 to the user by displaying a user interface image as illustrated in FIG. 19. In addition, in such a case, the output function 58 may notify an advice of a process to be performed for successful adaptation to the user. For example, the output function 58 may notify shortening of the exposure time to the user. When the process of S238 ends, the output function 58 ends the process of this flow.

In S239, the determination function 56 acquires a plurality of input images that are continuous and estimates the moving plane of a target object (for example, a person) in a three-dimensional space. Then, the determination function 56 determines whether or not a vanishing point of the estimated moving plane is below the optical axis of one imaging apparatus 12. When the vanishing point of the estimated moving plane is below the optical axis of the imaging apparatus 12 (S239: Yes), the determination function 56 causes the process to proceed to S240. On the other hand, when the vanishing point of the estimated moving plane is not below the optical axis of the imaging apparatus 12 (S239: No), the determination function 56 causes the process to proceed to S241.

When the vanishing point of the moving plane estimated from images captured by the imaging apparatus 12 is below the optical axis of the imaging apparatus 12, it is difficult to estimate the position of a moving target object. In other words, when the depression angle of the imaging apparatus 12 is small, it is difficult to estimate the position of a moving object from images captured by the imaging apparatus 12.

In S240, the determination function 56 determines a state in which the depression angle of the imaging apparatus 12 is small. In this way, the determination function 56 can notify the user that the factor of the unsuccessful adaptation is a small depression angle of the imaging apparatus 12.

Then, the output function 58 outputs information representing the state in which the depression angle of the imaging apparatus 12 is small as a result of the determination of the adaptation state. More specifically, the output function 58 outputs information representing unsuccessful adaptation and the unsuccessful adaptation due to a small depression angle of the imaging apparatus 12.

Figure 20:
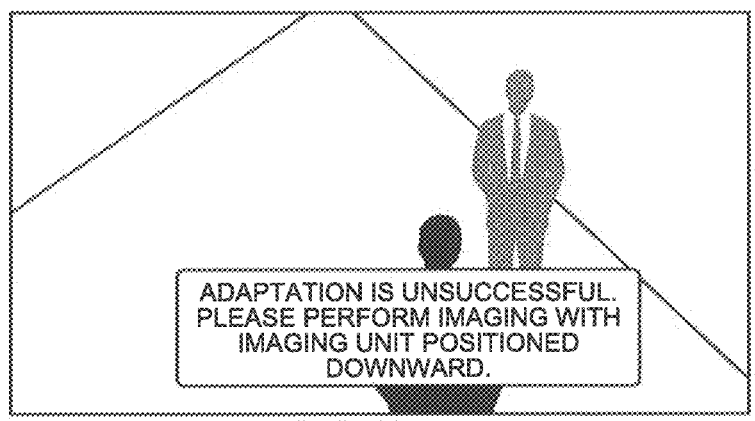
FIG. 20 is a diagram that illustrates an image displayed when a depression angle is small.

For example, the output function 58 notifies unsuccessful adaptation and a small depression angle of the imaging apparatus 12 to the user by displaying a user interface image as illustrated in FIG. 20. In addition, in such a case, the output function 58 may notify an advice of a process to be performed for successful adaptation to the user. For example, the output function 58 may notify increasing of the depression angle of the imaging apparatus 12 to the user. When the process of S240 ends, the output function 58 ends the process of this flow.

In S241, the determination function 56 determines a state in which the setting of one of the imaging apparatuses 12 is bad. Then, the output function 58 outputs information representing that the setting of one of the imaging apparatuses 12 is bad as a result of the determination of the adaptation state. For example, the output function 58 notifies the user that the adaptation is unsuccessful, and the setting of one of the imaging apparatuses 12 is bad. When the process of S241 ends, the output function 58 ends the process of this flow.

As above, when the adaptation is unsuccessful and when the number of pieces of positive example data is more than the first threshold set in advance or less than the second threshold, the determination function 56 can notify a state in which the quality of the images used for the adaptation is bad to the user. In this way, according to the determination function 56, also a user having no specific knowledge can respond appropriately, whereby the adaptation can be successful. For example, the determination function 56 can allow a user to appropriately respond by notifying a failure factor of the adaptation such as no capturing of a target object, out-of-focus of the imaging apparatus 12, no match of the gain, the brightness, or the iris of the imaging apparatus 12, no match of the exposure time of the imaging apparatus 12, or a small depression angle of the imaging apparatus 12 to the user.

In addition, a computer or a built-in system according to the embodiment is used for performing each process of the embodiment described above based on a program stored on a storage medium and may have a configuration of an apparatus formed by one of a PC, a microcomputer, and the like or a system in which a plurality of apparatuses are connected through a network. In addition, the computer according to the embodiment is not limited to the PC but includes an arithmetic processing device, a microcomputer, and the like included in an information processing device and collectively refers to devices and apparatuses capable of realizing the function according to the embodiment by using a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus to adapt an estimation model used for detecting a target object included in an image so as to detect the target object included in the image capturing a specific place, the apparatus comprising:
    a memory; and
    processing circuitry configured to:
        acquire a plurality of input images captured at the specific place;
        detect the target object included in the input images by performing a process different from a target object detecting process using the estimation model;
        extract a plurality of first local images each of which includes the target object from the input images, each first local image being one of the input images captured at the specific place;
        generate a plurality of pieces of positive example data, each piece including a target object-included first local image and correct answer information representing the target object included in the first local image;
        extract a plurality of second local images each of which does not include the target object from the input images, each second local image being one of the input images captured at the specific place;
        generates a plurality of pieces of negative example data each of which includes a second local image not including the target object and includes correct answer information representing no presence of the target object in the second local image;
        perform an adaptation of the estimation model so as to detect the target object included in the image capturing the specific place by using a part of the plurality of pieces of positive example data and a part of the plurality of pieces of negative example data;
        calculate an estimation accuracy of the estimation model on which the adaptation has been performed by using another part of the plurality of pieces of positive example data that is not used for the adaptation;
        determine the adaptation as successful when the calculated estimation accuracy is a predetermined accuracy or more;
        determine the adaptation as unsuccessful when the estimation accuracy is less than the predetermined accuracy; and
        output a result of determination of the adaptation as successful or as unsuccessful,
    wherein the processing circuitry determines a state in which the number of images used for the adaptation is small when performing of the adaptation is unsuccessful and when the number of the part of the plurality of pieces of positive example data used for the adaptation is a first threshold or less, and a second threshold or more, the second threshold being less than the first threshold.

2. The apparatus according to claim 1, wherein the processing circuitry:
    calculates an estimation accuracy of the estimation model on which the adaptation has been performed by using the another part of the plurality of pieces of positive example data that is not used for the adaptation and another part of the plurality of pieces of negative example data that is not used for the adaptation.

3. The apparatus according to claim 1, wherein the processing circuitry calculates at least one of the number of the input images to be additionally acquired and a time required for capturing the input images to be additionally acquired.

4. The apparatus according to claim 1, wherein the processing circuitry determines a state in which the number of the input images is small when the number of the input images is a predetermined number or less.

5. The apparatus according to claim 4, wherein the processing circuitry determines a state in which the number of the target object-included first local images is small when the number of the input images is more than the predetermined number.

6. The apparatus according to claim 5, wherein the processing circuitry calculates the number of the input images to be additionally acquired which are required for extracting the target object-included first local images of a number set in advance based on a ratio between the acquired number of the input images and the number of the target object-included first local images.

7. An information processing apparatus to adapt an estimation model used for detecting a target object included in an image so as to detect the target object included in the image capturing a specific place, the apparatus comprising:
    a memory; and
    processing circuitry configured to:
        acquire a plurality of input images captured at the specific place;
        detect the target object included in the input images by performing a process different from a target object detecting process using the estimation model;
        extract a plurality of first local images each of which includes the target object from the input images, each first local image being one of the input images captured at the specific place;
        generate a plurality of pieces of positive example data, each piece including a target object-included first local image and correct answer information representing the target object included in the first local image;

extract a plurality of second local images each of which does not include the target object from the input images, each second local image being one of the input images captured at the specific place;

generates a plurality of pieces of negative example data each of which includes a second local image not including the target object and includes correct answer information representing no presence of the target object in the second local image;

perform an adaptation of the estimation model so as to detect the target object included in the image capturing the specific place by using a part of the plurality of pieces of positive example data and a part of the plurality of pieces of negative example data;

calculate an estimation accuracy of the estimation model on which the adaptation has been performed by using another part of the plurality of pieces of positive example data that is not used for the adaptation;

determine the adaptation as successful when the calculated estimation accuracy is a predetermined accuracy or more;

determine the adaptation as unsuccessful when the estimation accuracy is less than the predetermined accuracy; and output a result of determination of the adaptation as successful or as unsuccessful, wherein the processing circuitry determines a state in which quality of the images used for the adaptation is poor when performing of the adaptation is unsuccessful and when the number of the part of the plurality of pieces of positive example data used for the adaptation is more than a first threshold, or less than a second threshold, the second threshold being less than the first threshold.

8. The apparatus according to claim 7, wherein the processing circuitry determines a state in which the target object is not imaged when the number of the target object-included first local images is a predetermined number or less.

9. The apparatus according to claim 7, wherein the processing circuitry determines an out-of-focus state of the imaging apparatus when a degree of sharpness of the input images is a predetermined value or less.

10. The apparatus according to claim 7, wherein the processing circuitry determines a state in which a gain, brightness, or an iris of the imaging apparatus is not matched when a contrast level of the input images is a predetermined value or less.

11. The apparatus according to claim 7, wherein the processing circuitry determines a state in which an exposure time of the imaging apparatus is long when a motion blur occurs in the input images.

12. The apparatus according to claim 7, wherein the processing circuitry determines a state in which a depression angle of the imaging apparatus is small when a vanishing point of a moving plane of the target object is below an optical axis.

13. The information processing apparatus according to claim 1, wherein the processing circuitry outputs information representing the adaptation being performed by the processing circuitry when the adaptation is started by the processing circuitry.

14. The apparatus according to claim 1, wherein the processing circuitry outputs information representing a time until completion of the adaptation performed by the processing circuitry when the adaptation is started by the processing circuitry.

15. An information processing method to adapt an estimation model used for detecting a target object included in an image so as to detect the target object included in the image capturing a specific place, the method comprising:

acquiring, by processing circuitry, a plurality of input images captured at the specific place;

detecting, by the processing circuitry, the target object included in the input images by performing a process different from a target object detecting process using the estimation model;

extracting, by the processing circuitry, a plurality of first local images each of which includes the target object from the input images, each first local image being one of the input images captured at the specific place;

generating, by the processing circuitry, a plurality of pieces of positive example data, each piece including a target object-included first local image and correct answer information representing the target object included in the first local image;

extracting, by the processing circuitry, a plurality of second local images each of which does not include the target object from the input images, each second local image being one of the input images captured at the specific place;

generating, by the processing circuitry, a plurality of pieces of negative example data each of which includes a second local image not including the target object and includes correct answer information representing no presence of the target object in the second local image;

performing, by the processing circuitry, an adaptation of the estimation model so as to detect the target object included in the image capturing the specific place by using a part of the plurality of pieces of positive example data and a part of the plurality of pieces of negative example data;

calculating, by the processing circuitry, an estimation accuracy of the estimation model on which the adaptation has been performed by using another part of the plurality of pieces of positive example data that is not used for the adaptation;

determining, by the processing circuitry, the adaptation as successful when the calculated estimation accuracy is a predetermined accuracy or more;

determining, by the processing circuitry, the adaptation as unsuccessful when the estimation accuracy is less than the predetermined accuracy;

outputting, by the processing circuitry, a result of determination of the adaptation as successful or as unsuccessful; and determining, by the processing circuitry, a state in which the number of images used for the adaptation is small when performing of the adaptation is unsuccessful and when the number of the part of the plurality of pieces of positive example data used for the adaptation is a first threshold or less, and a second threshold or more, the second threshold being less than the first threshold.

* * * * *